United States Patent
Sohn et al.

(10) Patent No.: US 10,497,257 B2
(45) Date of Patent: Dec. 3, 2019

(54) PARKING LOT SURVEILLANCE WITH VIEWPOINT INVARIANT OBJECT RECOGNITION BY SYNTHESIZATION AND DOMAIN ADAPTATION

(71) Applicant: NEC Laboratories America, Inc., Princeton, NJ (US)

(72) Inventors: Kihyuk Sohn, Fremont, CA (US); Luan Tran, Haslett, MI (US); Xiang Yu, Mountain View, CA (US); Manmohan Chandraker, Santa Clara, CA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 16/051,980

(22) Filed: Aug. 1, 2018

(65) Prior Publication Data
US 2019/0065853 A1    Feb. 28, 2019

Related U.S. Application Data

(60) Provisional application No. 62/553,090, filed on Aug. 31, 2017, provisional application No. 62/585,758, filed on Nov. 14, 2017.

(51) Int. Cl.
*G08G 1/017* (2006.01)
*G06K 9/62* (2006.01)
(Continued)

(52) U.S. Cl.
CPC ....... *G08G 1/0175* (2013.01); *G06K 9/00671* (2013.01); *G06K 9/6256* (2013.01);
(Continued)

(58) Field of Classification Search
CPC .. G08G 1/0175; G08G 1/0116; G08G 1/0129; G08G 1/04; G08G 1/048;
(Continued)

(56) References Cited

U.S. PATENT DOCUMENTS

2006/0233423 A1* 10/2006 Najafi ................. G06K 9/3208
382/103
2016/0155020 A1*  6/2016 Tariq .................. G06K 9/00771
382/105

OTHER PUBLICATIONS

Ganin et al., "Domain Adversarial Training of Neural Networks", Journal of Machine Learning Research 17 (2016), 1-35 (Year: 2016).*

(Continued)

*Primary Examiner* — Michael E Teitelbaum
(74) *Attorney, Agent, or Firm* — Joseph Kolodka (57) ABSTRACT

Systems and methods for vehicle surveillance include a camera for capturing target images of vehicles. An object recognition system is in communication with the camera, the object recognition system including a processor for executing a synthesizer module for generating a plurality of viewpoints of a vehicle depicted in a source image, and a domain adaptation module for performing domain adaptation between the viewpoints of the vehicle and the target images to classifying vehicles of the target images regardless of the viewpoint represented in the target images. A display is in communication with the object recognition system for displaying each of the target images with labels corresponding to the vehicles of the target images.

20 Claims, 6 Drawing Sheets

(51) Int. Cl.
   *G06K 9/00* (2006.01)
   *G06N 3/08* (2006.01)
   *G06N 3/04* (2006.01)
   *G06N 5/04* (2006.01)
   *G06T 17/00* (2006.01)
   *G06N 20/00* (2019.01)

(52) U.S. Cl.
   CPC ......... *G06K 9/6268* (2013.01); *G06N 3/0454* (2013.01); *G06N 3/08* (2013.01); *G06N 5/046* (2013.01); *G06N 20/00* (2019.01); *G06T 17/00* (2013.01)

(58) Field of Classification Search
   CPC ........ G06N 20/00; G06N 3/0454; G06N 3/08; G06N 3/046; G06K 9/6256; G06K 9/6268; G06T 17/00
   See application file for complete search history.

(56) References Cited

OTHER PUBLICATIONS

Yang, "A Large-Scale Car Dataset for Fine-Grained Categorization and Verification", CVPR, Jun. 2015, pp. 3973-3981.
Sohn, "Unsupervised Domain Adaptation for Face Recognition in Unlabeled Videos", ICCV, Oct. 2017, pp. 1-9.

* cited by examiner

PARKING LOT SURVEILLANCE WITH VIEWPOINT INVARIANT OBJECT RECOGNITION BY SYNTHESIZATION AND DOMAIN ADAPTATION

RELATED APPLICATION INFORMATION

This application claims priority to 62/553,090, filed on Aug. 31, 2017, and 62/585,758, filed on Nov. 14, 2017, incorporated herein by reference in their entirety. This application is related to an application entitled "VIEWPOINT INVARIANT OBJECT RECOGNITION BY SYNTHESIZATION AND DOMAIN ADAPTATION", and which is incorporated by reference herein in its entirety.

BACKGROUND

Technical Field

The present invention relates to object recognition and more particularly viewpoint invariant object recognition by synthesization and domain adaptation.

Description of the Related Art

Providing tools for computer vision, such as a neural network model for object recognition can be hampered by a lack of data to train the model. The training data for object recognition applications can be very costly to generate and acquire due to the large amount of human labor needed to label training images. Moreover, a set of training images may only have labelled images of objects from a particular viewpoint or under certain lighting. Thus, the model is only training for objects in certain environments. Obtaining training data for various perspectives to broaden the abilities of a model to recognize objects is even harder and more costly. Thus, training a neural network to develop an object recognition model that is accurate for more than one perspective multiplies the cost of obtaining training images as well as the time to train the model.

Additionally, an obstacle to efficient and accurate object recognition models can be a representation space. There are trade-offs between using higher-level versus lower-level spaces, such as, e.g. a low-level pixel space with strengths for geometric analysis, or a high-level feature space with strengths for semantic analysis. Confining an object recognition model to just one of these representation spaces may benefit from the strengths of the chosen space, but sacrifice the benefits of alternative spaces, thus limiting the applicability of the model in some scenarios.

SUMMARY

According to an aspect of the present principles, a system is provided for vehicle surveillance. The system includes a camera for capturing target images of vehicles. An object recognition system is in communication with the camera, the object recognition system including a processor for executing a synthesizer module for generating a plurality of viewpoints of a vehicle depicted in a source image, and a domain adaptation module for performing domain adaptation between the viewpoints of the vehicle and the target images to classifying vehicles of the target images regardless of the viewpoint represented in the target images. A display is in communication with the object recognition system for displaying each of the target images with labels corresponding to the vehicles of the target images.

According to another aspect of the present principles, a method is provided for vehicle surveillance. The method includes capturing target images of vehicles with a camera. Vehicles in the target images are determined with an object recognition system in communication with the camera, including generating a plurality of viewpoints of a vehicle depicted in a source image with a synthesizer module and performing domain adaptation between the viewpoints of the vehicle and the target images with a domain adaptation module to classifying vehicles of the target images regardless of the viewpoint represented in the target images. Each of the target images are displayed with labels corresponding to the vehicles of the target images on a display in communication with the object recognition system.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for viewpoint invariant object recognition by synthesization and domain adaptation.

In one embodiment, feature-space and pixel-space domain adaptations are implemented using semi-supervised learning of a domain adaptation model using unsupervised viewpoint synthesization. The domain adaptation can include training leveraging web images of objects to improve training of a generative adversarial network. Using a connection between domain adaptation and semi-supervised learning, a domain-adversarial neural network can be utilized that can more efficiently and more accurately train a neural network for object recognition with a relatively sparse set of training images, such as the web images.

According to aspects of the present invention, domain-adversarial training can be used for the domain adaptation neural network to accomplish feature-space domain adaptations. The domain-adversarial objective can be improved by eliminating the need for a distinct discriminator by implement principles of semi-supervised learning, such as, e.g., a joint parameterization of a classifier and the discriminator. Thus, a classifier can be better transferred to a target domain, increasing the accuracy of the network and reducing training time and training data sets.

Additionally, the sparse data sets, such as, e.g., labelled web images, can be further leveraged for training the domain adaptation neural network by using unsupervised viewpoint synthesization, including, e.g., photometric transformation and perspective transformation. The viewpoint synthesization leverages unsupervised networks to perform pixel-space adaptations to input images. Using, e.g., generative adversarial networks, the input image can be adapted to a new viewpoint without labelled training images. Thus, training is cheaper and more efficient while accuracy of the generative adversarial network can be continuously improved.

With respect to photometric transformations, the generative adversarial network can be improved using attribute conditioning to facilitate generating more than one output from the input. Thus, efficiency and speed of the network is improved by facilitating determining multiple pixel-space adaptations rather than one at a time.

Appearance flow can be used for, e.g., pixel-level perspective transformations. By modifying appearance flow networks to utilize key-points, sparse training data can be used, such as, e.g., three dimensional (3D) rendered images of objects. Because key-points can be used rather than less generalized actual objects, not only is training more efficient and cheap, but the speed and accuracy of the appearance flow network is improved.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
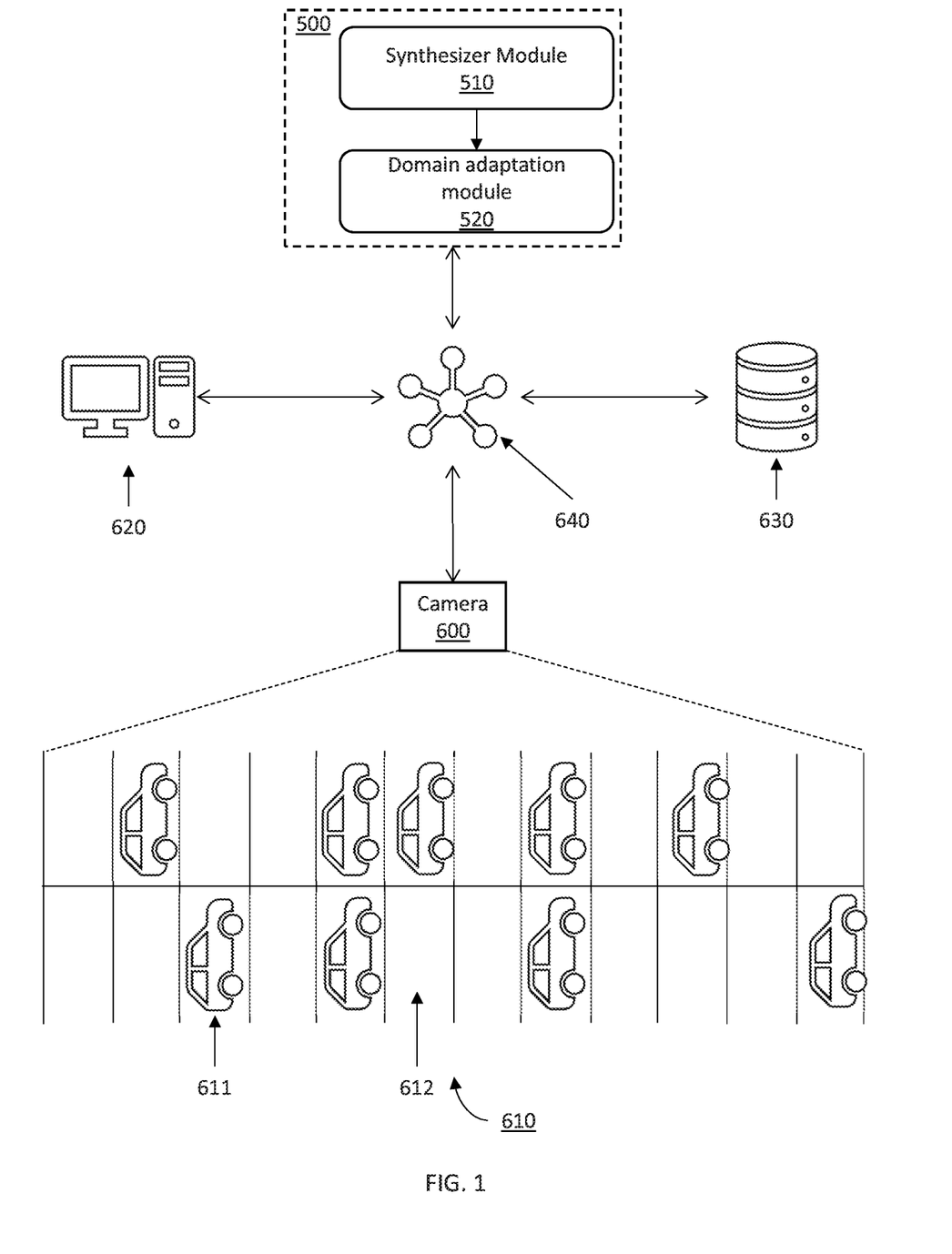
FIG. 1 is a block/flow diagram illustrating a system/method for vehicle identification in a surveilled parking lot, in accordance with the present principles.

Referring now in detail to the figures in which like numerals represent the same or similar elements and initially to FIG. 1, a system/method for vehicle identification in a surveilled parking lot is illustratively depicted in accordance with an embodiment of the present principles.

According to aspects of an embodiment of the present invention, synthesization and domain adaptation is used for vehicle recognition in surveilled parking lots to facilitate enforcing parking lot security.

According to aspects of the present invention, a parking lot 610 includes multiple parking spaces 612 for accommodating vehicle 611. A camera 600 can monitor the parking lot 610 to surveil the vehicles 611 occupying parking spaces 612. To facilitate monitoring the parking lot 610, the camera 600 can be in communication with, e.g., an object recognition system 500 to recognize vehicles and return an indication of the recognized vehicles. The camera 600 can also, e.g., be in communication with a network 640, including, e.g., a computer system 620 and a database 630.

The object recognition system 500 can employ domain adaptation to recognize vehicles. Because the camera 600 is capturing images over a wide physical area in a variety of lighting conditions, viewpoints on vehicles vary across a wide range of perspectives and lighting. Thus, a set of training data to train for this widely varying scenario is difficult to obtain because training pairs would be needed for each viewpoint possibility. Instead, the object recognition system 500 can be, e.g., configured to be trained using labeled images from a database 630, such as, e.g., a web-based database. Accordingly, the object recognition system 500 is trained with widely available and cheap labelled images that do not represent a large set of viewpoint possibilities. For example, the object recognition system 500 can be provided with front view images of cars of a variety of makes and/or models to train recognition of make and/or model of the vehicles 611.

To train the object recognition system 500 with the images from the database 630, the object recognition system can include domain adaptation to recreate the viewpoint possibilities. The domain adaptation can be performed by a synthesizer module 510, such as, e.g., the synthesizer module 510 discussed above, and a domain adaptation module 520, such as the domain adaptation module 520 discussed above. Accordingly, various viewpoints can be synthesized of labeled images from the database 630 using the synthesizer module 510. The domain adaptation module 520 can use the synthesized viewpoints as well as the original labelled images from the database 630 as source domain images to generalize neural network training for object recognition in the similar, but not necessarily equivalent target domain of the parking lot 610.

Accordingly, the synthesizer module 510 can include, e.g., photometric adjustment, perspective adjustment, and other view and style adjustments to represent a variety of scenarios. The synthesizer module 510 can be trained using web-collected images, similar to the labeled images of the database 630. However, the synthesizer module 510 can be trained using, e.g., 3D CAD models. Using 3D CAD modules facilitates forming source and target images for training according to desired perspectives by rendering the 3D CAD models in different views. The source and target images can thus be used to train view augmentation mechanisms, such as, e.g., appearance flow networks, as discussed above. In particular, the 3D CAD models can be rendered in a source representation and a target representation. 2D key-points can be generated from the rendered source representation to generalize the objects of the model. An appearance flow network can be implemented for predicting the source representation in the target domain using the rendered source representation. Concurrently, a key-point based appearance flow can be used to predict 2D key-points in the target domain using the generated 2D key-points. The 2D key-points can be fused with the source representation to predict a target image. The appearance flow and the key-point based appearance flow can then be jointly trained based on error between the predictions and the rendered target representation. The 2D key-point based appearance flow network can then be used to generate 2D key-points in the labeled images from the database 630 to synthesize a variety of viewpoints for each of the labeled images.

Additionally, a style augmentation mechanism can be used to, e.g., adjust lighting scenarios through photometric adjustment of the labeled images from the database 630. Photometric adjustment is a reversible process. Accordingly, training a network for photometric adjustment can be performed unsupervised using, e.g., adversarial training, such as with, e.g., CycleGAN. For example, the labeled images can be photometrically adjusted with a generator. The adjusted images can then be reversed with an inverse of the generator. Error between the original labeled images and the adjusted and reversed images can then be assess using a discriminator to determine error of the generator and its inverse. The generator can then be trained against this error. The generator can then be used to photometrically adjust the synthesized viewpoints of the labeled images to generate a variety of lighting styles for each of the synthesized viewpoints.

While a mechanism for viewpoint synthesization and mechanism for photometric adjustment have been discussed, other style and view synthesizations can be performed for any number of variables, such as, e.g., occlusion and partial occlusion of objects, among others. Thus, a variety of scenarios are created for each labeled image from the database 630 that can be used for training object recognition in the parking lot 610. For example, the front views of vehicles labeled with make and/or model of the vehicle can be synthesized to provide both day and night views of the vehicles of the images from elevation points in the range of about 0 and about 90 degrees of elevation, and at a perspective of between about 0 and about 90 degrees of perspective views. As a result, a large corpus of training data is created from the original labeled images.

The domain adaptation module 520 can use the corpus of training images to extract features from images captured by the camera 600 using, e.g., CNNs or other neural networks. The domain adaptation module 520 can also be trained to classify the extract features for labeling the captured images. Training can be performed using, e.g., domain adversarial neural networks (DANN), similar to those described above. In particular, feature extractors including, e.g., CNNs, can extract features from respective ones of the captured images and the training images. A classifier can then concurrently classify and perform domain discrimination on captured images and training images having corresponding viewpoints. The classifiers can then be trained to reduce the domain discrimination to zero, and effectively fool the domain discrimination of the classifier. The training of classifiers can then be incorporated into a loss function for training corresponding CNNs for each classifier. Because the classifier performs both classification and domain discrimination, the training can be accurately and efficiently performed by forcing the CNNs to generate classifiable representations into one of a set of defined classes for the target domain. Thus, the joint parameterization of classifier and discriminator into a single classifier forms a classifier-transfer objective that is both more accurate and more efficient in training the classifiers and CNNs.

The domain adaptation module 520 can then generate classifications corresponding to vehicle makes and/or modules based on the training from the labeled images of the database 630. Training can be performed concurrently with classification of the capture images, or separately. Training can also be performed continually to constantly improve the accuracy of the object recognition module 500.

The classified images can be labeled with labels corresponding to the classifications, such as, e.g., labels for the make and/or model of the vehicle 611 capture by the camera 600. The labels on the captured images can then be stored in the database 630, provided to a user via, e.g., a display or a computer 620. The labels on the captured images can also be provided to any other device in communication with the network 640.

The network 640 can be any network, such as, e.g., a wired or wireless network including a local area network, WiFi network, the Internet, an intranet system, a direct connection, or any other communication network.

Figure 2:
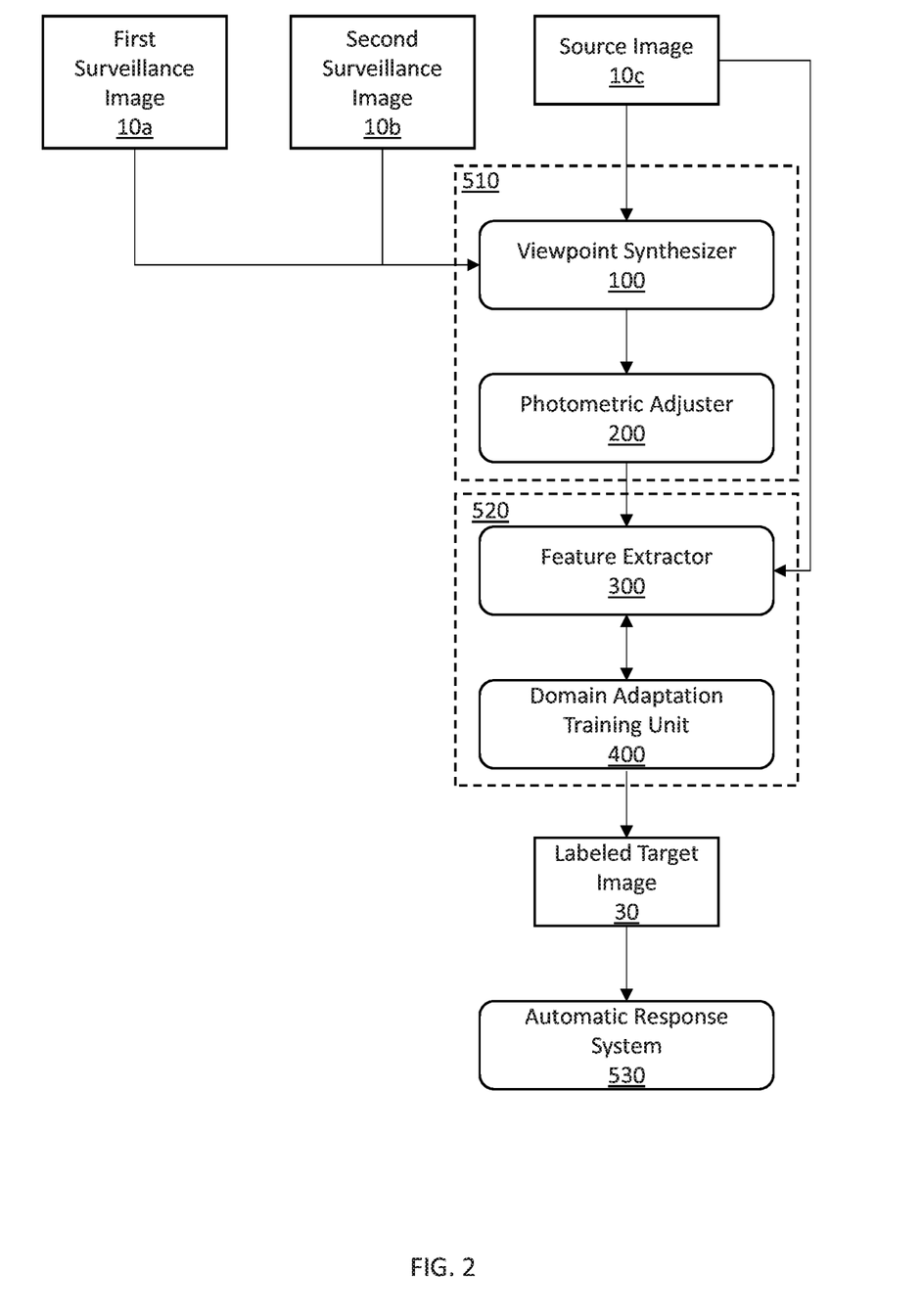
FIG. 2 is a block/flow diagram illustrating a high-level system/method for viewpoint invariant object recognition by synthesization and domain adaptation, in accordance with the present principles.

Referring now to FIG. 2, a high-level system/method for a system/method for viewpoint invariant object recognition by synthesization and domain adaptation is illustratively depicted in accordance with an embodiment of the present principles.

In accordance with an embodiment of aspects of the present invention, pixel-level and feature-level image transformations are employed to improve training efficiency and object recognition accuracy and speed. The system/method can process input images from more than one perspective of an environment. For example, an imaging device, such as, e.g., a camera, can capture images of a first set of images of an environment having a first perspective or viewpoint, such as, e.g., a first angle of elevation, and a second set of images of the environment having a second perspective or viewpoint. Therefore, the system can include surveillance images including a first surveillance image 10*a* and a second surveillance image 10*b* along with training images such as, e.g., a source image 10*c*, where the first surveillance image 10*a* and the second surveillance image 10*b* have different viewpoints. The images 10*a*, 10*b* and 10*c* can be processed by a system including, e.g., a synthesization module 510 having a viewpoint synthesizer 100 and a photometric adjuster 200, and a domain adaptation module 520 including a feature extractor 300 and a domain adaptation training unit 400.

The system utilizes more than one input image, including the first surveillance image 10*a* and the second surveillance image 10*b* to generate a labeled target image 30 with recognized objects in the surveillance images 10a and 10b. The objects are recognized using a feature extractor 300 which extracts semantic features from images. Therefore, the feature extractor 300 can be configured to analyze the surveillance images 10a and 10b, along with other images, to determine semantic features. Determining semantic features can include, e.g., a set of layers to determine successively higher-level features of the images. For example, the feature extractor 300 can include, e.g. a convolutional neural network (CNN) with a deeper CNN with more layers extracting higher-level features such that the extracted features are semantic rather than geometric. Thus, the feature extractor 300 can be, e.g., stored in a memory or a storage and executed using a processor.

To improve the feature extraction of the feature extractor 300, the feature extractor can be trained concurrently with feature extraction. Training can utilize a source image 10c, such as, e.g., labeled web images. Because training image sets can be expensive and difficult to produce or acquire, training images can be indexed from a network such as, e.g., the internet as web images with labeled contents. For example, the feature extractor 300 can be configured to extract vehicle makes and/or models from the surveillance images 10a and 10b. Thus, the web images can be images of a variety of vehicle makes and models found on the internet, each image being labeled with the vehicle make and/or model depicted therein. Thus, the source image 10c can be used to train the feature extractor 300 to recognize vehicle makes and/or models.

Because a surveillance camera may have multiple viewpoints of a given vehicle, including, e.g., at least the first surveillance image 10a and the second surveillance image 10b, the feature extractor 300 is more accurately trained by using source images, such as source image 10c having multiple viewpoints of vehicles. However, because the source images 10c are web images, there might not be a dense data set of every viewpoint of each vehicle to be identified. Viewpoints can include, e.g., perspective and camera angle, lighting, and any other variations in settings and conditions. Thus, view transformations can be utilized to transform the source image 10c into multiple views of the contents of the source image 10c.

View transformation can be performed at the pixel level using the viewpoint synthesizer 100 and the photometric adjuster 200. The viewpoint synthesizer 100 can transform the perspective, or angle of view, of the source image 10c. For example, where the source image 10c is a front view of a vehicle, the viewpoint synthesizer 100 can transformed the source image 10c to be, e.g., a 10 degree elevation view, or a 20 degree elevation view, or any other view, such as, e.g., any elevation view in the range of about 0 degrees to about 90 degrees, and any side view in a range of between about 0 degrees and about 90 degrees to the side. According to aspects of the present invention, the viewpoint synthesizer 100 can generate multiple transformations of the source image 10c including various views of the contents of the source image 10c. Thus, the source image 10c can be used to provide labeled training images to the feature extractor 300 having a variety of viewpoints of objects in the source image 10c.

Similarly, images such as, e.g., surveillance footage of vehicles, can be captured in a variety of lighting conditions. The variety of lighting conditions can pose problems for object recognition if a model has not been trained with different lighting conditions. Thus, the photometric adjuster 200 can be employed to adjust lighting in the source image 10c. For example, upon generating view transformations of the source image 10c with the viewpoint synthesizer 100, the photometric adjuster 200 can be used to adjust the lighting in each of the generated view transformations of the source image 10c. Thus, the objects in the source image 10c can be represented in a variety of perspectives as well as a variety of lighting conditions. Thus, training images for each of the variety of conditions can be provided to the feature extractor 300 for more efficient, more accurate and more economical training. Thus, each of the viewpoint synthesizer 100 and the photometric adjustor can be, e.g., stored in a memory or a storage and executed using a processor to generate a variety of images of the objects having different perspectives and lighting.

According to aspects of the present invention, training of the feature extractor 300 can be performed using, e.g., a domain adaptation training unit 400. The domain adaptation training unit 400 can train a target domain against a source domain. The target domain and source domain might not be identical. Thus, the domain adaptation training unit 400 is used to adapt a model to compare the source domain to the different target domain. In one embodiment according to aspects of the present invention, the source domain includes the source image 10c, along with the adjusted views of the source image 10c generated by the viewpoint synthesizer 100 and photometric adjuster 200. The target domain can include surveillance images to be analyzed by the feature extractor 300, including, e.g., the first surveillance image 10a and the second surveillance image 10b. Because the source domain and the target domain are not identical, the feature extractor 300 can be better trained for feature extraction if the domains are adapted.

According to aspects of the present invention, the domain adaption can include, e.g. an adversarial technique to adapt the source and target domains to extract similar features corresponding to similar objects despite the different domains. One example of a domain adaptation training unit 400 according to an embodiment of the present invention is, e.g., domain-adversarial training for universal domain adaption using a domain adversarial neural network (DANN). The adversarial technique of the DANN can accurately compare the source domain and the target domain for accurate training of the feature extractor 300. Moreover, a DANN that uses, e.g., a joint parametrized classifier and discriminator can reduce error rates in the adversarial training. To even further improve accuracy and efficient training, e.g., entropy regularization can be incorporated into the DANN. Entropy regularization can incorporate the principle that classification distributions should be "peaky" to better reflect unlabeled data. The domain adaptation unit 400 can be, e.g., stored in a memory or a storage and executed using a processor using a DANN stored in a memory or a storage and executed by the processor.

Loss objectives determined by the domain adaptation training unit 400 can be fed back to the feature extractor 300 to train the feature extractor 300 according to a loss corresponding to classification and domain discrimination. Thus, the feature extractor 300 is trained to fool a discriminator and thus is better adapted to the target domain for feature extraction. Accordingly, the output labeled target image 30 is more accurately and efficiently produced according to a better trained feature extractor 300 that can concurrently extract features from surveillance images 10a and 10b and continue training according to domain adaptation and domain-adversarial training.

Additionally, class labels of the labeled target image 30 can be used by an automatic response system 530. The automatic response system 530 can include, e.g., a parking lot ticketing system that automatically generates a ticket for illegally parked vehicles, or a traffic camera that automatically generates a ticket for vehicles that violate traffic laws, such as, e.g., running a red light. Other suitable automatic response systems 530 are contemplated, including systems suitable for, e.g., generating any form including data on recognized vehicles or other objects.

Figure 3:
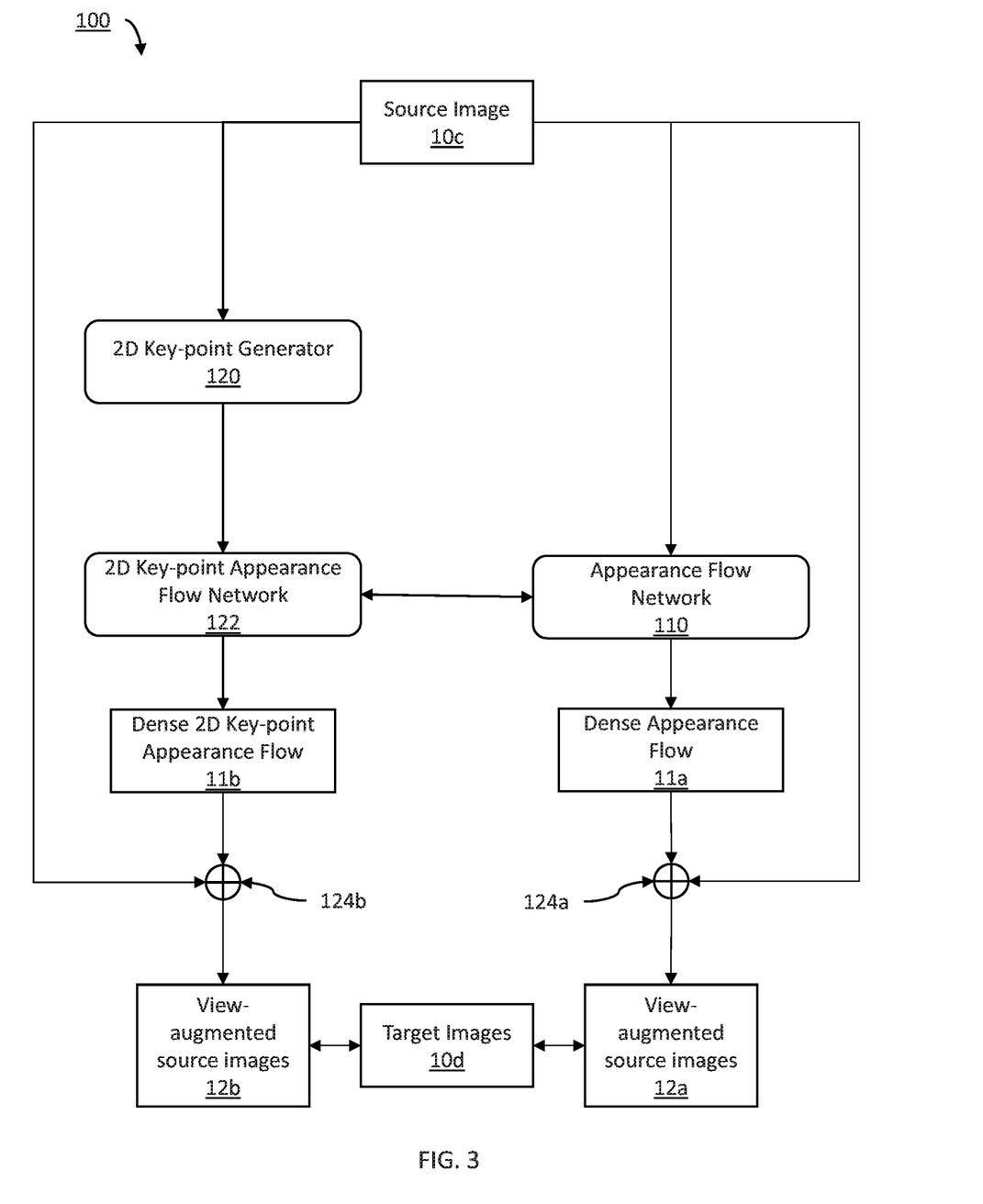
FIG. 3 is a block/flow diagram illustrating a system/method for key-point-based perspective transformation, in accordance with the present principles.

Referring now to FIG. 3, a system/method for key-point-based perspective transformation is illustratively depicted in accordance with an embodiment of the present principles.

According to an aspect of the present invention, an embodiment of a viewpoint synthesizer 100 can include appearance flow networks 110 and 122. The appearance flow network 110 can generate an appearance flow from a source image 10c and train the two dimensional (2D) key-point appearance flow network 122 according to a robust representation of an appearance flow for the source image 10c.

The appearance flow network 110 can include, e.g., estimating a dense flow of pixels between a source 10c and a target viewpoint 10d. Once estimated, the appearance flow representation can be synthesized using bilinear sampling to reorganize pixels. The appearance flow network 110 can be trained by comparing a predicted view-augmented source image 12a from the output appearance flow representation to a ground truth representation of the target viewpoint 10d.

However, the source viewpoint of the source image 10c and the ground truth target image 10d can be difficult to obtain as training pairs because the variation can only include the viewpoint change. Thus, highly controlled datasets of real images can be used to train the appearance flow network. However, these highly controlled datasets are impracticably expensive and difficult to obtain. Thus, the source image 10c during training can include, e.g., rendered three dimensional (3D) computer aided design (CAD) images. These 3D CAD images are readily available and provide 3D information for objects represented therein. As a result, the 3D CAD images can be accurately rendered in the source viewpoint and the target viewpoint to provide the source image 10c and the ground truth target image 10d. Thus, the trained appearance flow network 110 can produce a robust appearance flow representation of the source image 10c including a 3D CAD image that has been rendered into a 2D image. Thus, a view-augmented source image 12a including the target viewpoint of the objects of the source image 10c can be accurately predicted.

While the appearance flow network 110 can produce robust, dense appearance flow representations for a target image 10d, the appearance flow network 110 utilizes pixel-level detail. Thus, when trained on rendered 3D CAD images, the appearance flow network 110 generate precise appearance flow representations that may not be generalizable to real-life images. Accordingly, the robust appearance flow representations can be used to train a more general 2D key-point appearance flow network 122. Thus, the 2D key-point appearance flow network 122 is incorporated to synthesize an appearance flow for 2D key-points of an image.

The use of 2D key-points generalize well across domains because 2D key-points leverage higher-level geometric features as opposed to pixel-level geometric features. Thus, general shapes can be captured with 2D key-points, and the 2D key-point appearance flow network 122 can be trained according to the general geometric features that can represent objects of a class, such as, e.g., vehicles.

Accordingly, a 2D key-point generator 120 can generate 2D key-points corresponding to geometric features of the source image 10c. The 2D key-points form a general representation of the object of the source image 10c, such as, e.g., a vehicle of a particular make and/or model. The 2D key-points can be provided to the 2D key-point appearance flow network 122. Thus, the 2D key-point appearance flow network 122 can generate appearance flow representations of a source image 10c rendered from a 3D CAD image in parallel with the appearance flow network 110 generating the pixel-level appearance flow representation of the same source image 10c.

The 2D key-point appearance flow representation can be used to then predict a dense 2D key-point appearance flow 11b corresponding to a target viewpoint. When combined at a combiner 124b, the dense 2D key-point appearance flow 11b can modify the source image 10c. The modification can include a synthesis of multiple other viewpoints of the source image 10c. Thus, view-augmented source images 12b can be synthesized from a dense 2D key-point appearance flow 11b augmented source image 10c.

Similarly, appearance flow network 110 can generate a dense appearance flow 11a of the source image 10c based on pixel-level analysis. The dense appearance flow 11a can then be used to augment the source image 10c at a combiner 124a, such that the source image 10c can be modified to synthesize multiple other viewpoints. Thus, view-augment source images 12a are also synthesized, e.g., concurrently with synthesization of the view-augmented source images 12b.

Because the appearance flow network 110 has been trained against the ground truth target image 10d corresponding to the source image 10c, the knowledge from the pre-trained appearance flow network 110 can be distilled for training the 2D key-point appearance flow network 122 by determining a loss between the robust appearance flow representation of the appearance flow network 110 and the 2D appearance flow representation of the 2D key-point appearance flow network 122. The loss determination can be combined with a loss determined by a difference between a view-augmented source image 12b generated from the estimated 2D key-point appearance flow representation and the ground truth target image 10d. Thus, the 2D key-point appearance flow network 122 is concurrently trained with knowledge from the appearance flow network 110 as well as with a ground truth target image 10d.

As a result, the 2D key-point appearance flow network 122 can generate robust predictions that generalize well across domains, while also including knowledge of pixel-level insights into appearance flow. Compared to a pixel-level appearance flow network alone, such as, e.g. the appearance flow network 110, the 2D key-point appearance flow network 122 can produce augmented images that have a per-pixel reconstruction error relative to the rendered 3D CAD models of 0.072. The appearance flow network 110 alone can be trained to achieve a reconstruction of 0.071. Thus, the 2D key-point appearance flow network 122 can attain a comparable level of accuracy with greater generalization across domains.

The viewpoint synthesizer 100 described above can be implemented to predict one or more view-augmented source images 12b. Because rendered 3D CAD images are used for training, any number of target images 10d can be used to train the appearance flow network 110 and the 2D key-point appearance flow network 122 using the 3D data of the 3D CAD images. For example, where the source image 10c is a front view of a vehicle, the viewpoint synthesizer 100 can be trained to predict view-augmented source images 12a and 12b at target viewpoints including, e.g., a 10 degree elevation view, or a 20 degree elevation view, or any other view, such as, e.g., any elevation view in the range of about 0 degrees to about 90 degrees, and any side view in a range of between about 0 degrees and about 90 degrees to the side.

Furthermore, upon training, the viewpoint synthesizer 100 can be used to predict a target viewpoint for source images 10c including the web-collected images and generate views of objects in the web-collected images at a variety of perspectives. The web-collected images can be provided to both the appearance flow network 110 and the 2D key-point appearance flow network 122 to concurrently train the 2D key-point flow network 122 while predicting a view-augmented source image 12b of the web-collected images. Thus, while a target image 10d may not exist for each web-collected source image, the appearance flow network 110 can still be implemented to provide insight to the 2D key-point appearance flow network 122 while the 2D key-point appearance flow network 122 predicts a view-augmented source image 12b.

Figure 4:
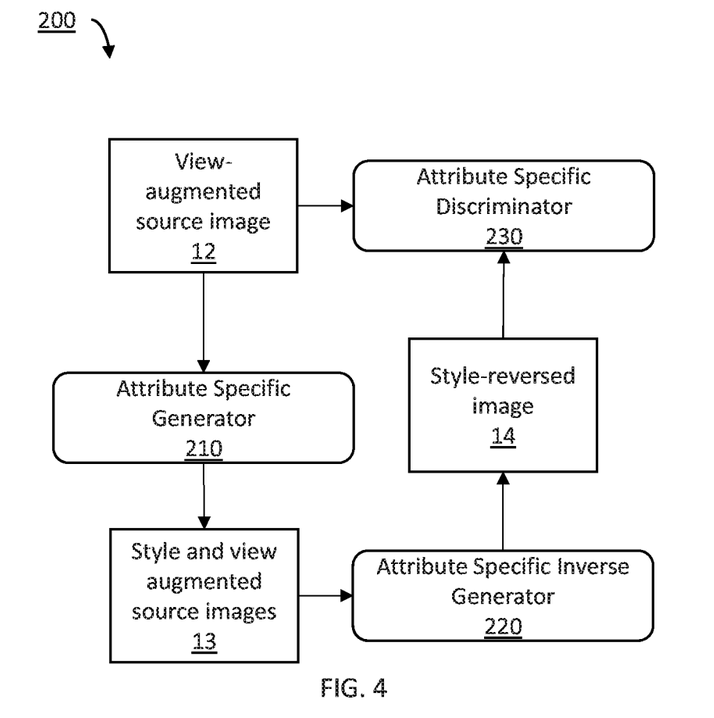
FIG. 4 is a block/flow diagram illustrating a system/method for adversarial photometric transformation, in accordance with the present principles.

Referring now to FIG. 4, a system/method for adversarial photometric transformation is illustratively depicted in accordance with an embodiment of the present principles.

According to an embodiment of the present invention, view-augmented source images 12 having predicted perspectives of a source image 10c can be provided to the photometric adjuster 200 to predict different lighting conditions of the objects in the view-augmented source images 12. Because surveillance images 10a and 10b can include a variety of lighting variations, adjusting the domain of the source images 10c to including corresponding lighting variations can improve training of a feature extractor 300.

According to aspects of the present invention, photometric adjustment can be performed by an attribute specific generator 210. The attribute specific generator 210 can implement a neural network as a generator that produces color adjustments to the view-augmented source image 12. The attribute specific generator 210 can, therefore, include, e.g., a neural network including a UNet neural network to preserve geometric structures of the view-augmented source image 12.

The attribute specific generator 210 can be trained in a generative adversarial network (GAN), such as, e.g., CycleGAN or other GANs. Thus, the attribute specific lighting generator 210 generates one or more adjustments to lighting for each of the input images, thus outputting predicted style and view augmented source images 13. However, a GAN such as, e.g., a CycleGAN may be confined to only predicting one output style, such as lighting, for each input image. Thus, the GAN of the generator 210 can be attribute conditioned such that multiple style changes can be predicted by incorporating a condition variable into the generator 210 to form the attribute specific generator 210. The condition variable can include multiple conditions, such as, e.g., lighting corresponding to day and to night, as well as lighting conditions in between, such as twilight, as well as any other adjustments.

By incorporating the condition variable, the attribute specific generator 210 can generate image adjustments according to a particular attribute, thus facilitating diverse output images with the same geometric structures. Therefore, each view-augmented source image 12 can be used to generator a variety of style and view augmented source images 13, where the style refers to the condition being predicted and generated. Thus, the attribute specific generator 210 can predict an augmentation to the view-augmented source image 12 including, e.g., a style augmentation including lighting (e.g., day versus night lighting). The augmentation, therefore, is applied to the view-augmented source image 12 in the attribute specific generator 210 to predict one or more style and view augmented source images 13 corresponding to each attribute of augmentation.

To train the attribute specific generator 210, the style and view augmented source images 13 are style-reversed by an attribute specific inverse generator 220 to predict a style-reversed image 14 that returns the images back to the domain of the view-augmented source image 12. The attribute specific inverse generator 220 can be any generator for reversing the style augmentation applied by the attribute specific generator 210 such as, e.g., an inverse of UNet. According to an embodiment of the present invention, the attribute specific inverse generator 220 is a generator formed by the inverse of the attribute specific generator 210. Thus, only one generator needs to be trained to provide attribute specific augmentation and attribute specific inverse augmentation.

By reversing the style augmentation applied by the attribute specific generator 210, the style-reverse image 14 reflects a degree of error in the attribute specific generator 210. Accordingly, the style-reversed image 14 can be discriminated against the view-augmented source image 12 using an attribute specific discriminator 230 to determine a degree of error in the augmentation and reverse augmentation process. The attribute specific discriminator 230 can therefore include, e.g., a patchGAN to make real/fake decisions from local patches. Thus, a loss can be determined between the style-reversed image 14 and the view-augmented source image 12 according to an adversarial analysis having cycle consistency with the attribute specific inverse generator 220.

Because the photometric adjuster 200 is unsupervised and is capable of training without any training images, the photometric adjuster 200 can be continually trained as source images 10c are view augmented with the viewpoint synthesizer 100 and style augmented with the photometric adjuster 200. Thus, the attribute specific generator 210 is continually improving, increasing the accuracy and the efficiency of the style augmentation.

Figure 5:
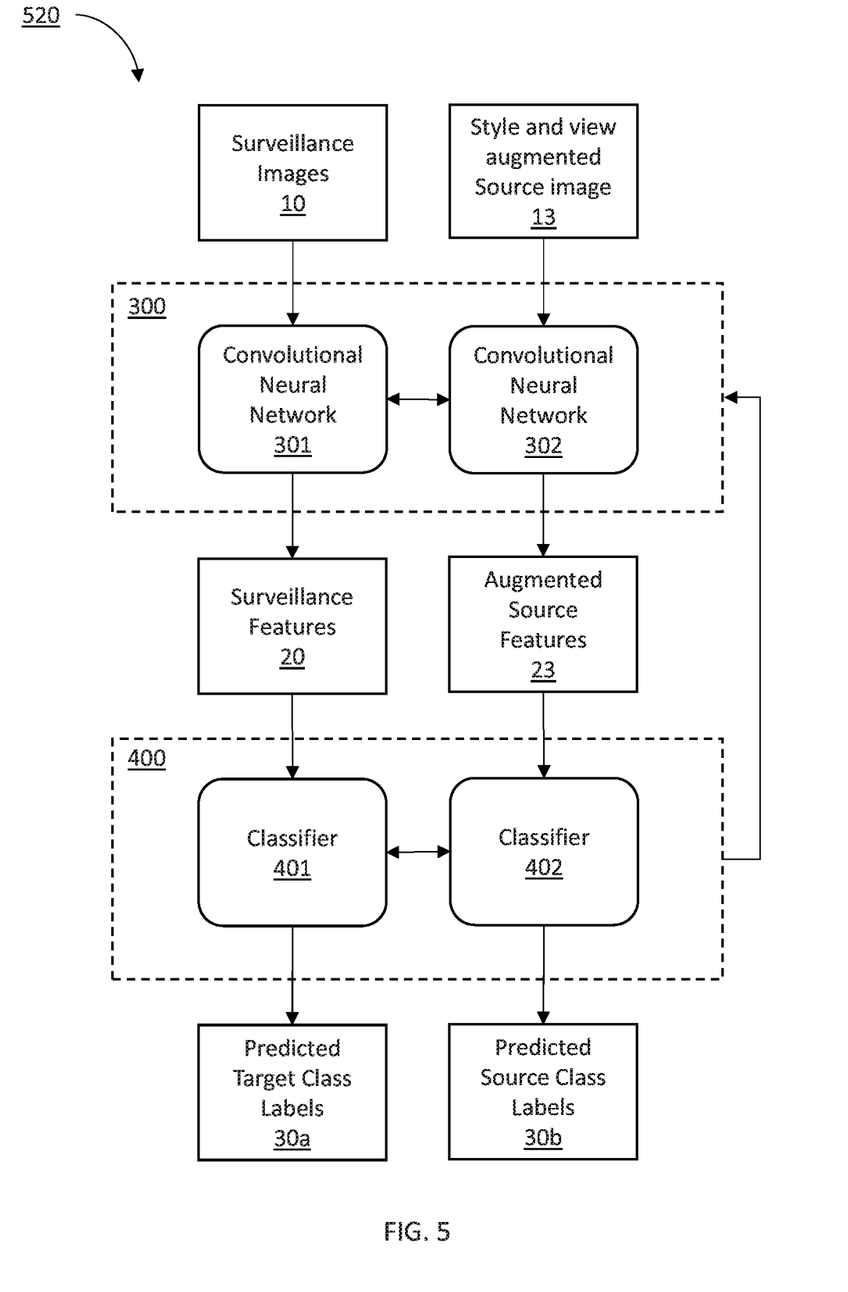
FIG. 5 is a block/flow diagram illustrating a system/method for feature extraction with domain-adversarial training for domain adaptation, in accordance with the present principles.

Referring now to FIG. 5, a system/method for feature extraction with domain-adversarial training for domain adaptation is illustratively depicted in accordance with an embodiment of the present principles.

According to embodiments of the present invention, the feature extractor 300 extracts features 20 and 23 for feature-level domain adaptation with the help of the domain adaptation training unit 400. The domain adaptation training unit 400 can assist with training the feature extractor 300 to extract features from a target domain of surveillance images 10 as trained against the source domain of the style and view augmented source images 13. Because the surveillance images 10 and the style and view augmented source images 13 are from different domains, e.g., adversarial training can be used to train the feature extractor 300. Using adversarial training facilitates unsupervised training, thus reducing the need for large training sets having source and target domain pairs. Thus, a possible structure for the domain adaptation module 520 is, e.g., a domain adversarial neural network (DANN).

The DANN structure of the domain adaptation module 520 facilitates training a surveillance image 10 of the target domain by training the feature extractor 300 to reduce difference between feature presentations of surveillance image 10 and the style and view augmented source image 13 of the source domain. Thus, the domain adaptation module 520 trains the feature extractor 300 to extract the same features from the surveillance image 10 and the style and view augmented source image 13 when each of the surveillance image 10 and the style and view augmented source image 13 contain the same objects.

To train the feature extractor 300, a convolutional neural network (CNN) 301 extracts surveillance features 20 from the surveillance image 10 while another CNN 302 concurrently extracts augmented source features 23 from the style and view augmented source image 13. Each of the CNN 301 and 302 can be, e.g., any neural network for extracting feature representations form input images. One possible embodiment of the present invention includes, e.g., shared parameters or weights between each CNN 301 and 302. By sharing weights between the CNN 301 and the CNN 302, both CNNs 301 and 302 can be jointly trained according to domain adaptation training unit 400.

The domain adaptation training unit 400 trains the feature extractor 300 according to differences in the feature representations generated by the feature extraction module 300. Accordingly, the domain adaptation training unit 400 compares the surveillance features 20 to the augmented source features 23. For the comparison, the domain adaptation training unit 400 can, e.g., employ adversarial training such as, e.g., an unsupervised domain adaptation (UDA) scheme. Thus, the UDA scheme of the domain adaptation training unit 400 trains the feature extractor 300 to produce feature representations that indistinguishable, yet maintain discriminative power. Thus, the domain adaptation training unit 400 determines a classification of each of the features 20 and 23 as well as a discrimination.

While the domain adaptation training unit 400 can perform classification and discrimination with, e.g., separate classifiers and discriminators, a joint parameterized structure can be used instead such that classifiers without separate discriminators are used. According to the joint parameterization, the domain adaptation training unit 400 includes a classifier 401 for determining both classification and domain discrimination for the surveillance features 20, and a classifier 402 for determining both classification and domain discrimination for the augmented source features 23. As a result, a domain-adversarial objective function of a loss function can be reformulated in each classifier 401 and 402 as a classifier-transfer objective function.

As a result of using classifiers without discriminators, the classifiers 401 and 402 can each generate outputs that include, e.g., entries for class scores corresponding to each classification as well as an additional entry for a domain classification score corresponding to domain discrimination. Thus, the classifier 401 and the classifier 402 will each include, e.g., parameters for determining both feature classifications and domain classification for the surveillance features 20 and the augmented source features, respectively. These parameters can be trained according to a loss function, including, e.g., a softmax loss function such as the function of equation 1 below:

$$\min_{\theta_C}\{\mathcal{L}_C = \mathbb{E}_{\chi_s}\log C(f(x), y) + \mathbb{E}_{\chi_t}\log C(f(x), N+1)\}, \quad \text{Equation 1}$$

where $\theta_C$ are parameters for the classifiers 401 and 402 being optimized by Equation 1, $\mathcal{L}_C$ is the cross-entropy loss for the classifiers 401 and 402, $\chi_s$ is the set of source domain data including the style and view augmented source image 13, $\chi_t$ is the set of target domain data including the surveillance image 10, $\mathbb{E}_{\chi_s}$ denotes the expected value for source domain, $\mathbb{E}_{\chi_t}$ denotes the expected value for the target domain, C is a class score function, $f(x)$ is the feature representation function, y is a class label of a set of labels, and N is the number of categories of class labels.

Thus, the loss function for the classifier parameters $\theta_C$ include both a source domain classifier 402 term, as well as an N+1 entry of the target domain classifier 401. The N+1 entry in each classifier 401 and 402 is the entry provided for domain discrimination classification. Thus, optimizing the parameters for the classifiers 401 and 402 includes optimizing for a domain class in addition to label classes y. As a result, rather than separately training a domain discriminator, the classifiers 401 and 402 are trained to incorporate domain discrimination by assigning domain discrimination as a class of the classifiers 401 and 402.

However, the class score function $C(f(x),y)$ is equivalent of a function the product of the class score function given a set of class labels $C(f(x),(y|\gamma))$ and the class score function for the discriminator class $C(f(x),N+1)$ such that $C(f(x),y) = C(f(x),(y|\gamma))(1-C(f(x),N+1))$. Accordingly, Equation 1 can be rewritten as follows in Equation 2:

$$\min_{\theta_C} = \{\mathcal{L}_C = \mathbb{E}_{\chi_s}\log C(f(x), (y|Y)) + \quad \text{Equation 2}$$
$$\mathbb{E}_{\chi_s}\log(1 - C(f(x), N+1)) + \mathbb{E}_{\chi_t}\log C(f(x), N+1)\},$$

where $\mathbb{E}_{\chi_s}\log C(f(x),(y|\gamma))$ is equivalent to the loss attributable to classification, and $\mathbb{E}_{\chi_s}\log(1-C(f(x),N+1)) + \mathbb{E}_{\chi_t}\log C(f(x),N+1)$ is equivalent to the loss attributable to discrimination.

Therefore, upon applying the loss function of Equation 1 or Equation 2, the classifier parameters $\theta_C$ can be updated using, e.g., gradient descent, such as, e.g., stochastic gradient descent to jointly train parameters of each of classifier 401 and classifier 402. In addition to updating the classifier parameters $\theta_C$, the loss $\mathcal{L}_C$ calculated, including the loss attributable to classification. The loss attributable to classification can be used to then train the CNNs 301 and 302 using a loss function such as, e.g., a softmax loss function including Equation 3 below:

$$\min_{\theta_f}\{\mathcal{L}_f = \quad \text{Equation 3}$$
$$\mathbb{E}_{\chi_s}\log C(f(x), (y|Y)) + \lambda\mathbb{E}_{\chi_t}\log(f(x), 1 - C(N+1))\},$$

where $\theta_f$ are parameters for the CNNs 301 and 301 being optimized by Equation 2, $\mathcal{L}_f$ is the cross-entropy loss for the CNNs 301 and 302, and $\lambda$ is a hyper-parameter that balances classification and domain discrimination.

Thus, the classifiers 401 and 402 are trained via cross entropy loss, and the loss of the classifiers 401 and 402 can be used to then jointly train the parameters of the CNNs 301 and 302. As a result, the CNNs 301 and 302 are trained in an adversarial technique to fool a domain class of the classifiers 401 and 402 without the use of a separate discriminator. As a result, calculations are reduced while also improving the accuracy of feature extraction and classification. As a result, the domain adaptation module 520 is made more accurate and more efficient for more reliable predicted target class labels 30a and predicted source class labels 30b.

Accuracy can be even further improved, according to aspects of the present invention, through the use of entropy regularization. Because the loss functions of Equations 1, 2 and 3 do not assume prior classification distributions of the target data, the CNNs 301 and 302 may not be trained for an accurate distribution of features. However, the classifiers 401 and 402 can be trained for more accurate distributions of unlabeled data by minimizing entropy of the classification distribution. In particular, the entropy regularization can include promoting peaky class prediction to one of N classes by modifying Equation 3 as reflected in Equation 4 below:

$$\min_{\theta_f} \{\mathcal{L}_f = \mathbb{E}_{\chi_s} \log C(f(x), (y|Y)) + \lambda \mathbb{E}_{\chi_t} \left[\sum_{i=1}^{N} C(i) \log(i) + \gamma \log(f(x), 1 - C(N+1))\right]\},$$ Equation 4 where i is an index from 1 to N+1 and γ is a hyper-parameter that balances classification distribution with discriminator fooling objectives.

Here, the term $\Sigma_{i=1}^{N} C(i)\log(i)$ facilitates promoting peaky predictions of the classifiers 401 and 402, while the term γ log(ƒ(x), 1–C(N+1)) promotes learning to fool the discriminator of the domain class score. As a result, Equation 4 represents an entropy regularized version of the domain adaptation module 520 that balances predicting a peaky classification distribution with fooling a discriminator. As a result, predicted target class labels 30*a* and predicted source class labels 30*b* are made more accurate.

Figure 6:
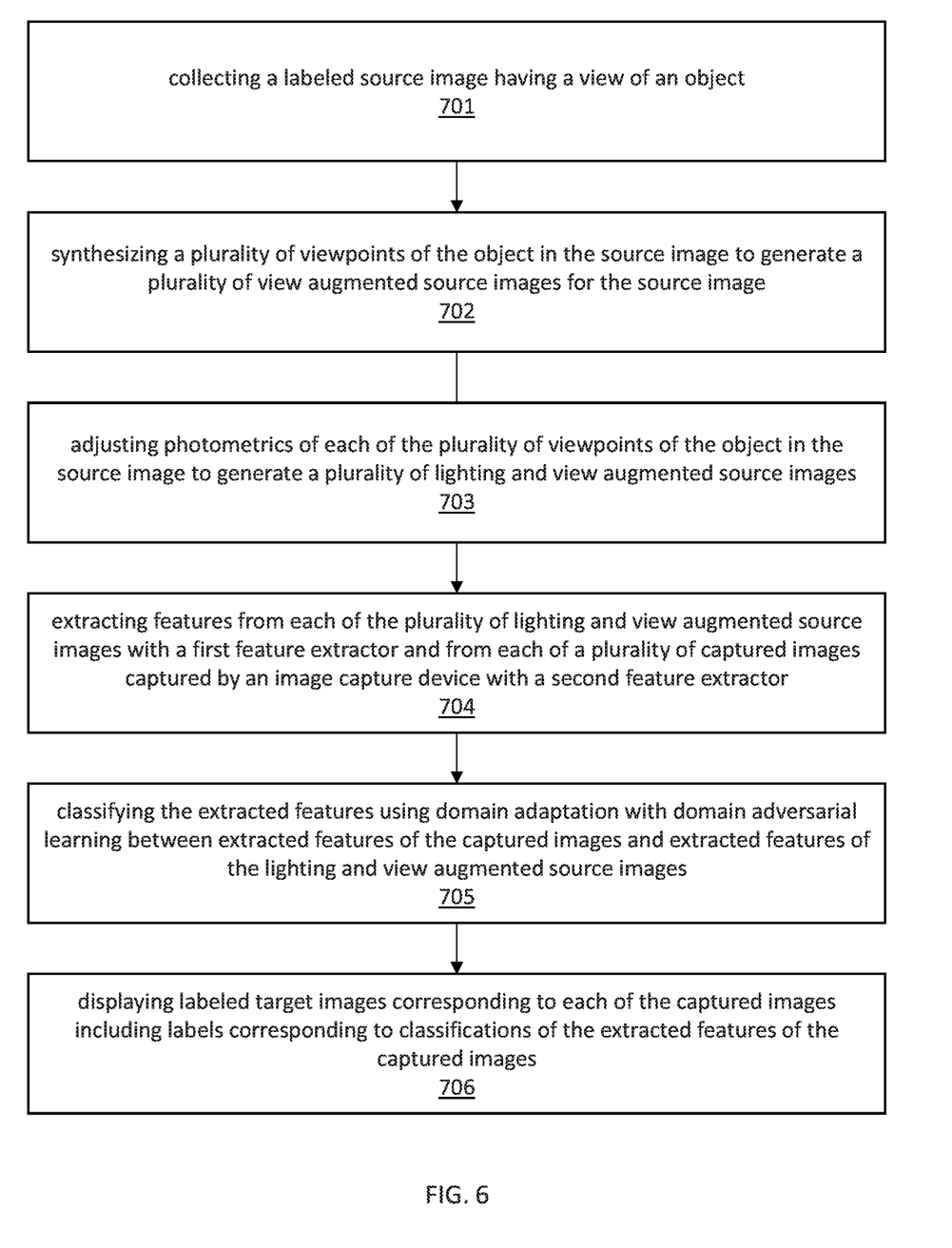
FIG. 6 is a flow diagram illustrating a system/method for viewpoint invariant object recognition by synthesization and domain adaptation, in accordance with the present principles.

Referring now to FIG. 6, a system/method for viewpoint invariant object recognition by synthesization and domain adaptation is illustratively depicted in accordance with an embodiment of the present principles.

At block 701, collect a labeled source image having a view of an object.

At block 702, synthesize a plurality of viewpoints of the object in the source image to generate a plurality of view augmented source images for the source image.

At block 703, adjust photometrics of each of the plurality of viewpoints of the object in the source image to generate a plurality of lighting and view augmented source images.

At block 704, extract features from each of the plurality of lighting and view augmented source images with a first feature extractor and from each of a plurality of captured images captured by an image capture device with a second feature extractor.

At block 705, classify the extracted features using domain adaptation with domain adversarial learning between extracted features of the captured images and extracted features of the lighting and view augmented source images.

At block 706, display labeled target images corresponding to each of the captured images including labels corresponding to classifications of the extracted features of the captured images.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for vehicle surveillance, the system comprising:
   a camera for capturing target images of vehicles;
   an object recognition system in communication with the camera, the object recognition system including a processor for executing:
      a synthesizer module for generating a plurality of viewpoints of a vehicle depicted in a source image; and
      a domain adaptation module for performing domain adaptation between the viewpoints of the vehicle and the target images to classifying vehicles of the target images regardless of the viewpoint represented in the target images, wherein
      classifiers are trained using cross entropy loss, and a loss of the classifiers is utilized to jointly train parameters of a neural network, and
      an entropy regularized version of the domain adaptation module is determined by $$\min_{\theta_f} \left\{ \mathcal{L}_f = \mathbb{E}_{\chi_s} \log C(f(x), (y|Y)) + \lambda \mathbb{E}_{\chi_t} \left[ \sum_{i=1}^{N} C(i)\log(i) + \gamma \log(f(x), 1 - C(N+1)) \right] \right\},$$

wherein $\theta_f$ are parameters, $\mathcal{L}_f$ is the cross entropy loss, λ is a hyper-parameter, i is an index from 1 to N+1, γ is a hyper-parameter, $\mathbb{E}_{\chi_s} \log C(f(x), (y|\gamma))$ is a loss attributable to classification, $\chi_s$ is a set of source domain data, $\chi_t$ is a set of target domain data, $\mathbb{E}_{\chi_s}$ is an expected value for the source domain, $\mathbb{E}_{\chi_t}$ is an expected value for the target domain, C is a class score function, ƒ(x) is a feature representation function, y is a class label of a set of labels, and N is a number of categories of class labels; and
   a display in communication with the object recognition system for displaying each of the target images with labels corresponding to the vehicles of the target images.

2. The system of claim 1, wherein the labels include a make and a model of each of the vehicles.

3. The system of claim 1, further including a network for collecting the source image.

4. The system of claim 3, wherein the network is the internet.

5. The system of claim 1, wherein the synthesizer module further includes:
   a viewpoint synthesizer for generating a plurality of augmented source images, each of the augmented source images having a different viewpoint; and
   a photometric adjuster for generating a plurality of lighting and view augmented source images for each of the augmented source images to reflect a corresponding plurality of lighting conditions.

6. The system of claim 5, wherein the different viewpoints include an angle of elevation of a view of the vehicle.

7. The system of claim 5, wherein the lighting conditions are selected from the group consisting of day light and night lighting.

8. The system of claim 1, wherein the domain adaptation module includes domain adversarial neural network.

9. The system of claim 8, wherein the domain adversarial neural network includes:

first convolutional neural networks corresponding to the lighting and view augmented source images for extracting source features;
second convolutional neural networks corresponding to the target images for extracting target features;
first classifiers corresponding to the first convolutional neural networks for classifying the extracted source features and for classifying source domain discrimination; and
second classifiers corresponding to the second convolutional neural networks for classifying the extracted target features for classifying target domain discrimination.

10. The system of claim 9, wherein:
the first convolutional neural networks and the second convolutional neural networks share feature parameters; and
the first classifiers and the second classifiers share classification parameters.

11. A method for vehicle surveillance, the method comprising:
capturing target images of vehicles with a camera;
determining vehicles in the target images with an object recognition system in communication with the camera, including:
generating a plurality of viewpoints of a vehicle depicted in a source image with a synthesizer module; and
performing domain adaptation between the viewpoints of the vehicle and the target images with a domain adaptation module to classifying vehicles of the target images regardless of the viewpoint represented in the target images, wherein
classifiers are trained using cross entropy loss, and a loss of the classifiers is utilized to jointly train parameters of a neural network, and
determining an entropy regularized version of the domain adaptation module by $$\min_{\theta_f}\left\{\mathcal{L}_f = \mathbb{E}_{\chi_s}\log C(f(x), (y\mid Y)) + \lambda \mathbb{E}_{\chi_t}\left[\sum_{i=1}^{N} C(i)\log(i) + \gamma\log(f(x), 1 - C(N+1))\right]\right\},$$

wherein $\theta_f$ are parameters, $\mathcal{L}_f$ is the cross entropy loss, $\lambda$ is a hyper-parameter, i is an index from 1 to N+1, $\gamma$ is a hyper-parameter, $\mathbb{E}_{\chi_s}\log C(f(x), (y\mid\gamma))$ is a loss attributable to classification, $\chi_s$ is a set of source domain data, $\chi_t$ is a set of target domain data, $\mathbb{E}_{\chi_s}$ is an expected value for the source domain, $\mathbb{E}_{\chi_t}$ is an expected value for the target domain, C is a class score function, $f(x)$ is a feature representation function, y is a class label of a set of labels, and N is a number of categories of class labels; and
displaying each of the target images with labels corresponding to the vehicles of the target images on a display in communication with the object recognition system.

12. The method of claim 11, wherein the labels include a make and a model of each of the vehicles.

13. The method of claim 11, further including a network for collecting the source image.

14. The method of claim 13, wherein the network is the internet.

15. The method of claim 11, wherein the synthesizer module further includes:
a viewpoint synthesizer for generating a plurality of augmented source images, each of the augmented source images having a different viewpoint; and
a photometric adjuster for generating a plurality of lighting and view augmented source images for each of the augmented source images to reflect a corresponding plurality of lighting conditions.

16. The method of claim 15, wherein the different viewpoints include an angle of elevation of a view of the vehicle.

17. The method of claim 15, wherein the lighting conditions are selected from the group consisting of day light and night lighting.

18. The method of claim 11, wherein the domain adaptation module includes domain adversarial neural network.

19. The method of claim 18, wherein the domain adversarial neural network includes:
first convolutional neural networks corresponding to the lighting and view augmented source images for extracting source features;
second convolutional neural networks corresponding to the target images for extracting target features;
first classifiers corresponding to the first convolutional neural networks for classifying the extracted source features and for classifying source domain discrimination; and
second classifiers corresponding to the second convolutional neural networks for classifying the extracted target features for classifying target domain discrimination.

20. The method of claim 19, wherein:
the first convolutional neural networks and the second convolutional neural networks share feature parameters; and
the first classifiers and the second classifiers share classification parameters.

* * * * *